United States Patent
Garvin et al.

[15] 3,659,510
[45] May 2, 1972

[54] APPARATUS AND METHOD UTILIZABLE IN FORMING METAL GRIDS

[72] Inventors: Hugh L. Garvin, Malibu; Elvin E. Herman; Russell R. Law, both of Pacific Palisades; Roger R. Turk, Woodland Hills, all of Calif.

[73] Assignee: Hughes Aircraft Company, Culver City, Calif.

[22] Filed: May 1, 1969

[21] Appl. No.: 820,737

[52] U.S. Cl. .................................. 95/12, 355/102, 355/109
[51] Int. Cl. ......................................................... G03b 29/00
[58] Field of Search ............................. 95/12; 355/102, 109

[56] References Cited

UNITED STATES PATENTS

| | | | |
|---|---|---|---|
| 3,040,620 | 6/1962 | Ferris | 95/12 |
| 3,181,419 | 5/1965 | Knaup et al. | 95/12 |
| 3,103,849 | 9/1963 | Wise | 350/271 X |

Primary Examiner—Samuel S. Matthews
Assistant Examiner—Robert P. Greiner
Attorney—Paul M. Cable and W. H. MacAllister, Jr.

[57] ABSTRACT

Apparatus and method for forming metal grids. The apparatus includes a support, carriage, photomask, photolamp, and interferometer. A photographic plate is positioned on the support and the photomask is attached to the carriage which is translated to thereby carry the photomask across the photographic plate. The interferometer allows repetitive exposure of the plate by the photolamp via the photomask by measuring the position of the carriage and by controlling a photolamp trigger circuit for flashing the photolamp when predetermined carriage positions are sensed by the interferometer. The photomask contains a single slit through which light rays from the photolamp pass whereby the successive flashing of the photolamp is operative to form a pattern of parallel, closely spaced image patterns in the photographic plate. The thus exposed photographic plate is developed and the resultant photographic master is replicated in a sequence of steps resulting in the formation of a metal grid on a target substrate. Salient features of the apparatus and method contribute to the successful provision of metal grids characterized by substantially uniform spacing between parallel adjacent grid lines which increases the range of applications in which the grids can be utilized.

6 Claims, 13 Drawing Figures

Patented May 2, 1972

Hugh L. Garvin,
Elvin E. Herman,
Russell R. Law,
Roger R. Turk,
INVENTOR.

BY.

Andrew M. Lesnick

ATTORNEY.

APPARATUS AND METHOD UTILIZABLE IN FORMING METAL GRIDS

This invention relates to apparatus and method useful in producing metal grids. More particularly, the invention relates to apparatus and method useful in producing storage tube target grids or the like.

Heretofore, the production of grids of the type with which the present invention is concerned has been accomplished by the photographic replication of photographic masters. Unfortunately, the grids produced have not been entirely satisfactory in various applications notwithstanding the rigorous precision with which the individual steps involved in the production of the grids are performed. In certain storage tube grid applications employing target grids, such as low-level signal detection, variations in the grid line spacing are, desirably, to be minimized. In many storage tube applications wherein spatial noise contributions by the tube's target grid detract from a detection of low-level signals, an undue restriction on target utility is imposed by failure to hold various imperfections in the target grid within acceptable limits. In general, imperfections in the grid may be traced to imperfections in the photographic master which in turn are primarily attributable to the formation of a grid line pattern in the photographic master by the use of mechanical ruling techniques.

As one example of a prior production technique, one may consider a photographic master comprising opaque film, on a glass substrate, in which numerous aperture slits have been scribed to form a pattern which can be photographically replicated to obtain a corresponding metal grid. Non-uniform spacing between adjacent slits results from periodic errors in the screw drive mechanism of the ruling engine and, consequently, the spacing between grid lines of a grid derived from the photographic master is irregular or nonuniform. Additionally, perfectly straight, noninterrupted aperture slits are most difficult to achieve considering the number of aperture slits involved; wavey squiggles, skips, and other imperfections in individual slits are unavoidable. These imperfections are repeated in the grid ultimately derived from the photographic master. The aforementioned irregular spacing and aforementioned imperfections effectively limit the degree of utility of the grid in many applications.

The useable signal-to-noise ratio of a storage tube can be defined as 20 times the log of one half the ratio of the peak-to-peak signal output voltage of the rms spatial background noise voltage contributed by irregularities in the grid target. In a solid dielectric storage tube, the ratio of the area of adjacent metal-free squares on the surface of the target substrate between the grid lines closely approximates the decibel error as defined above because the written signal is related to the electrical capacitance of the metal-free squares. Targets, produced in accordance with the present invention are characterized by decibel errors of at least 40 decibels or better. This indicates that the area variation of adjacent metal-free squares on the target surface is held to a tolerance of about one percent.

Prior to the present invention, techniques such as the one mentioned above involving the repetitive scribing of aperture slits into a film on a glass substrate to form a photographic master, produced targets with error uniformity no better than about 33–35 decibels which indicates an area variation of adjacent metal-free squares of about three to five percent. Area variations or decibels of error of this magnitude are unacceptable in many storage tube applications where spatial noise contributions by the tube's target detract from detection of low-level signals, thus unduly restricting the utility of the resultant target.

Accordingly, the present invention, inter alia, relates to the production of photographic masters relatively free of imperfections.

Still another object of the present invention is to provide a photographic master having nearly perfect, substantially identical, uniformly spaced, opaque lines or strips which can be replicated to produce storage tube target grids.

Another object of the present invention is to provide techniques for producing grids relatively free of irregularities in the spacing between parallel grid lines.

Another object of the present invention is to provide apparatus useful in the production of storage tube targets or the like.

Briefly, these and other objects and advantages of the present invention may be accomplished by forming a single, near perfect, aperture slit in opaque metal film on a transparent substrate to thereby form a photomask wherein light or radiant energy may pass through the aperture slit. Subsequently, a photographic plate comprising a film of photosensitive emulsion on a transparent substrate of suitable material, such as glass or quarts, is positioned on a support with the emulsion uppermost.

The photomask is placed upon the photographic plate with its metal film facing the emulsion. The photomask is slidably translated across the film surface in a direction preferably transverse to the length of the aperture slit and at a substantially constant velocity while successive, equispaced strips of the emulsion are subjected to pulses of ultraviolet-rich light via the aperture slit at periodic spacing intervals determined by the counting of interference light fringes. After the desired number of exposures have occurred, the emulsion is developed and converted into light, relatively transparent film with a series of dark, opaque lines or strips located therein. The transparent material corresponds to nonexposed emulsion while the opaque material corresponds to exposed emulsion. Subsequently, the desired grid is formed by techniques involving the photographic replication of the opaque line pattern in the photographic master or developed photographic plate.

Other aims and objects, as well as a more complete understanding of the present invention, will appear from the following explanation of an exemplary embodiment and the accompanying drawings thereof, in which.

Figures 1, 2:
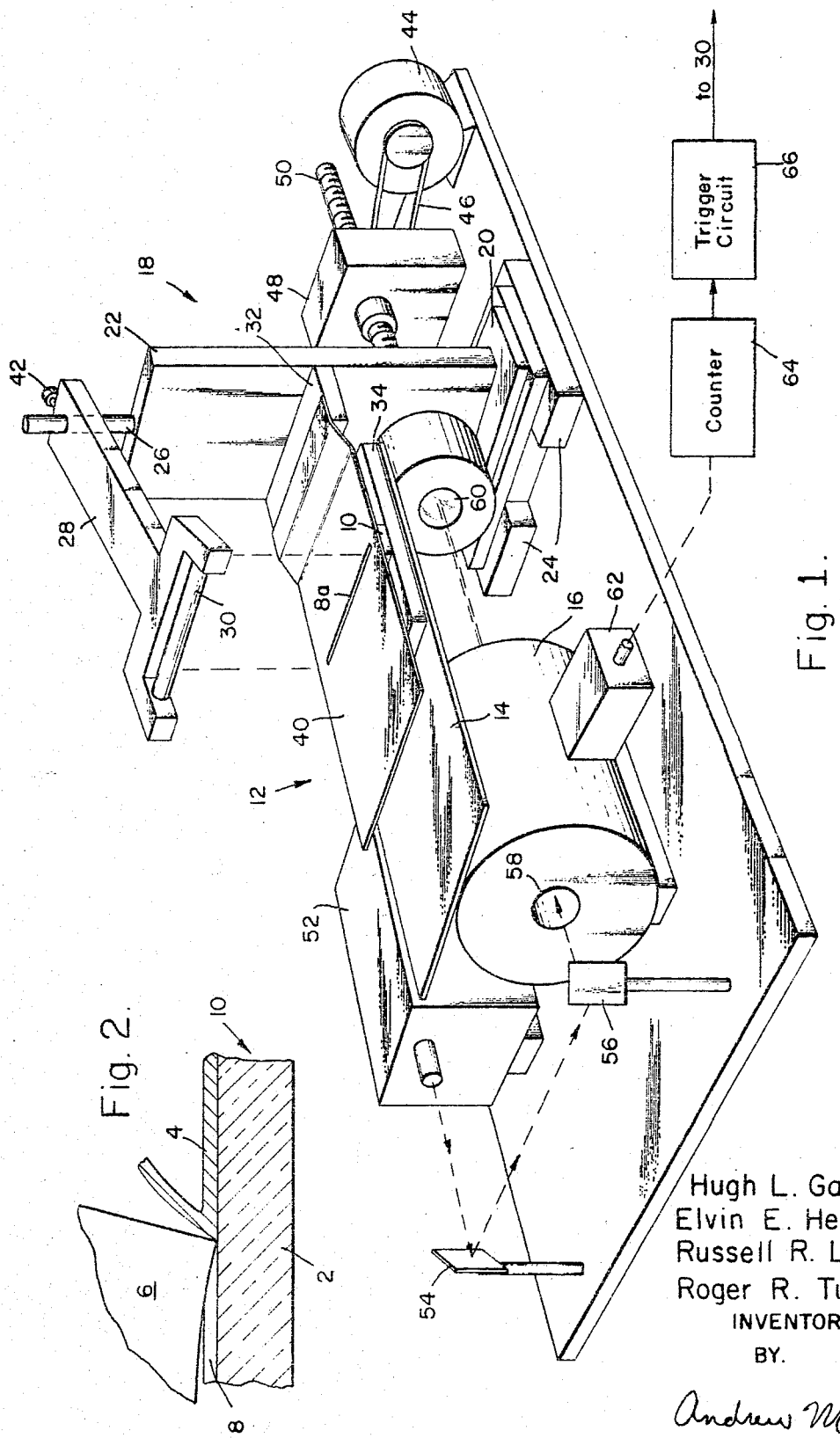
FIG. 1 is a perspective view of apparatus for exposing portions of a photoresist layer on a metal coated substrate through a photomask.
FIG. 2 depicts scribing apparatus for preparing the photomask utilized in the apparatus of FIG. 1.
Figure 3A:
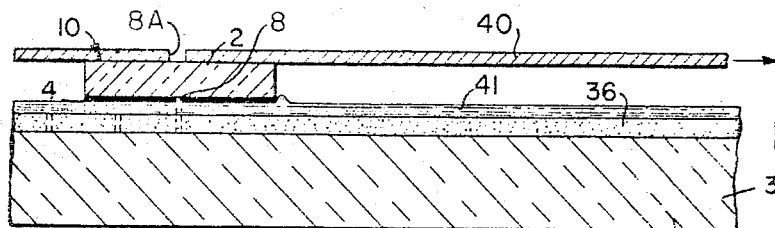
Figure 3B:
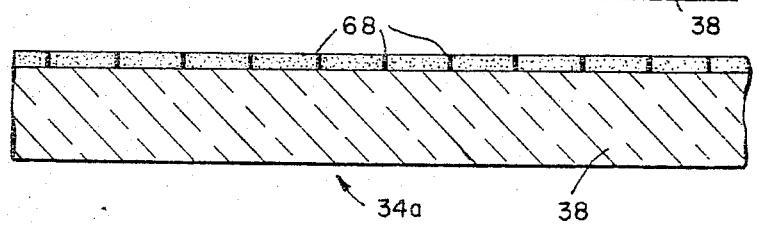
Figure 4A:
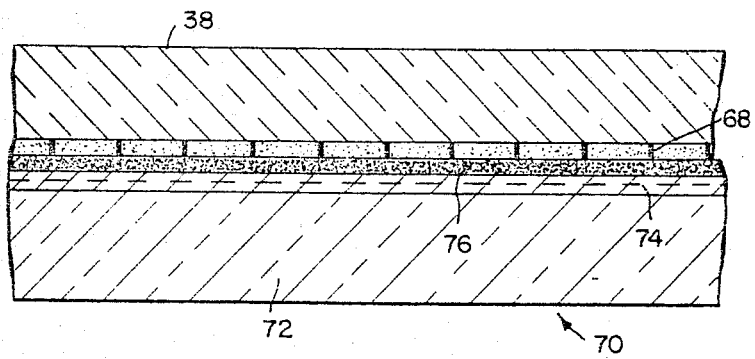
Figure 4B:
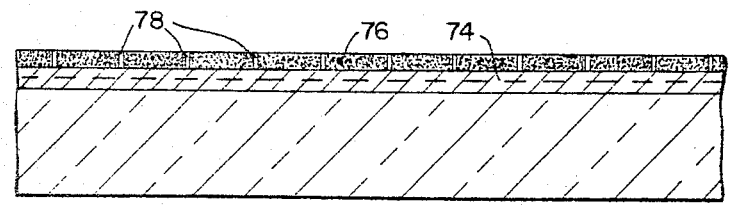
Figure 5A:
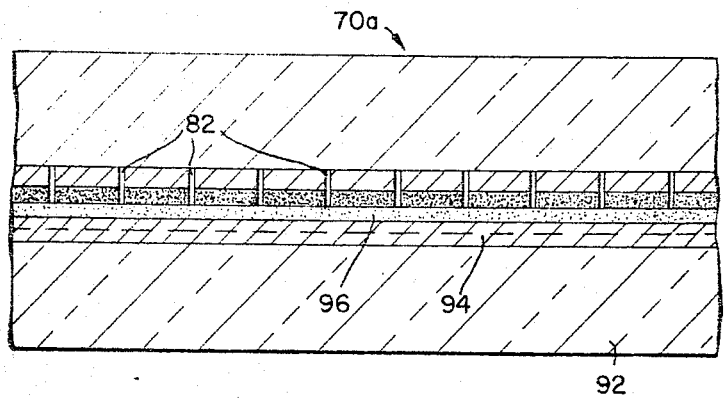
Figure 5B:
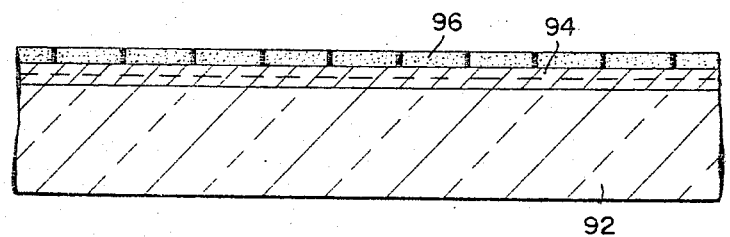
Figure 5C:
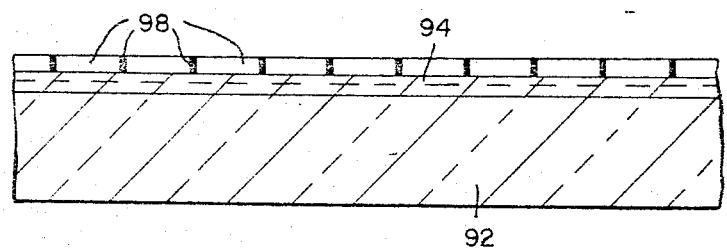
Figure 5D:
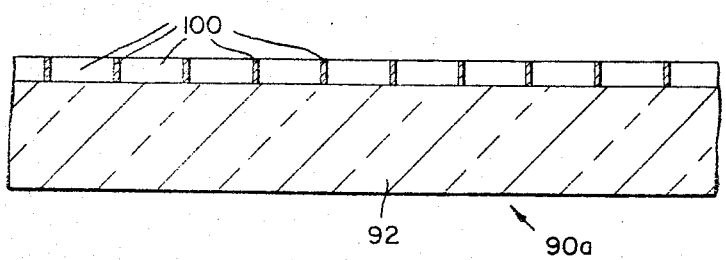
Figure 6:
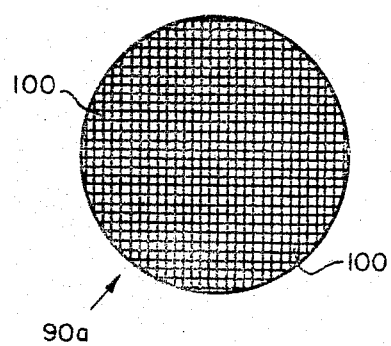

FIG. 3a schematically depicts movement of the photomask of FIGS. 1 and 2 to successively align the aperture slit thereof with respective areas of the photographic plate;

FIG. 3b depicts the photographic plate after completion of exposure and development of the photosensitive emulsion;

FIGS. 4a–d respectively depict (a) alignment of a master with a submaster blank, (b) exposed and unexposed portions after the operations on the specimen depicted in FIG. 4a, (c) removed material to form aperture slits in the photoresist, and (d) removed metal below the slits;

FIGS. 5a–d respectively depict (a) photoresist exposure on a target blank, (b) an exposed photoresist on the target blank, (c) removed photoresist portions on the target blank to form a grid array, and (d) a portion of a finished target grid in cross-section; and FIG. 6 is a plan view of the storage tube target grid of FIG. 5d fabricated by use of the present invention.

The fashion in which the foregoing is accomplished may be best understood by references to FIGS. 2–5 which depict various stages of the process outlined above and to FIG. 6 which depicts the resultant target.

FIG. 2 is illustrative of the manner in which a single, very precise aperture slit is formed in an opaque metal film on a transparent substrate in order to form the photomask which is utilized in the apparatus of FIG. 1 Before proceeding with a detailed description of FIG. 2, the manner in which the metal film is provided on the glass substrate will be described as it is very important that the metal film be relatively thin and yet sufficiently thick so as to be opaque. It is also important that the opaque metal film be clean, uniform, and readily scribable.

In order to obtain such a film, a substrate of glass 2 or other suitable transparent material is first provided. The glass substrate 2 is scrubbed with chalk cleaner, then cleansed in nitric acid ($HNO_3$). A first layer of aluminum is evaporated onto the substrate to a thickness of about 250 angstroms. This layer is then scrubbed with water wet cotton, rinsed, and spin dried. The scrubbing, rinsing, and drying steps following the evaporation steps serve to clean the evaporated aluminum by removing contaminants from the surface thereof. The aforementioned aluminum evaporation and cleaning steps are repeated twice more to form an aluminum film 4 about 750 angstroms thick on the glass substrate. By evaporating the aluminum in several steps, each followed by the contaminant removing cleansing steps, the likelihood that such contaminants as do remain will overlap to produce pinholes extending entirely through the aluminum film is virtually nil.

An aperture slit may now be scribed in the aluminum film in the manner illustrated in FIG. 2. Briefly, the coated substrate 2 is positioned relative to a diamond chisel 6 in a scribing machine. Relative movement is effected between the diamond chisel and the substrate by means of a counterweighted pulley mechanism coupled to a substrate supporting platform which moves the substrate under the chisel which is held stationary. The diamond chisel 6 traverses the substrate to scribe a straight aperture slit 8 of uniform width into the aluminum layer 4. Chisel shape and chisel pressure applied to the substrate 2 determine the precision and accuracy of the resultant slit. Exemplarily, a 5 micron wide chisel point, scribing through 750 angstrom thick aluminum, having a rake angle of about 10° and a relief angle of about 5° is utilized under a chisel scribing pressure of about 300–400 milligrams to form a 5 micron wide aperture slit which is several inches long. Since it is desired that the aperture slit 8 be of the utmost perfection, a multiplicity of aluminum coated glass substrates 2 may be provided, a singular aperture slit 8 may be scribed into the aluminum films 4 on the respective glass substrates 2, and the substrate 2 having the metal film 4 in which the best aperture slit has been scribed may be selected for use as a photomask 10 in the manner shown in FIG. 1.

The preferred method for producing the target grid disclosed herein necessarily results in the recurrence of imperfections or errors such as a squiggle in each grid line at corresponding points to produce a repetitive error which is generally considered undesirable. For this reason great efforts are made to obtain as near perfect lines as possible in the manner described with reference to FIG. 2.

FIG. 1 illustrates table mounted apparatus 12 in a hooded chamber for excluding light. The apparatus 12 may alternately be located in a dark room. Stationary support platform 14 is supported on beam splitter housing 16. Carriage 18, comprising base 20 and upright post member 22, is slidably mounted on parallel guide blocks 24. Post mounted shaft 26 supports arm 28 which carries a photolamp 30. Ledge member 32 is attached to carriage 18 by suitable means at an elevation sufficient to clear a photographic plate 34, comprising high resolution emulsion film 36 on a transparent glass substrate 38 (see FIG. 3a), positioned on the platform 14. A flexible light shield 40 is a sheet metal member glued to ledge member 32 and containing an aperture slit 8A aligned with the photomask 10, previously described with reference to FIG. 2, which is glued to the bottom side of the light shield 40. Other types of photomasks may be utilized, but the use of the disclosed photomask 10 is preferred as it affords a relatively thin, slit containing opaque light barrier (the aluminum layer 4) important to the obtainment of good definition quality images produced by exposure through the photomask slit. Alternate arrangements may be utilized to attach the photomask 10 to carriage 18 for movement therewith.

Once the photographic plate 34 is positioned on the support, low fluorescence, microscopic immersion oil 41 is applied to the photosensitive emulsion on the photographic plate 34. Light from the flashlamp or photolamp 30 is in the ultraviolet light range, hence it is essential that the lubricant or oil does not itself emit or give off light in response to the illumination thereof by ultraviolet light. If this occurred it would cause image distortion. Therefore, microscopic immersion oil is utilized. The selected oil preferably has an index of refraction approximately the index of refraction of the transparent substrates of the respective photographic plate 34 and photomask 10. The photomask 10 is then disposed thereon. The oil lubricants the interface between the photomask 10 and the photographic plate 34 to facilitate the moving of the photomask 10 across the photographic plate 34 in the course of apparatus operation and, additionally, serves to preclude the formation or existence of air spaces at the interface to prevent undue reflection of light rays due to mismatch of index of refraction which would be detrimental to the attainment of sharply defined opaque images in a transparent field in the photographic plate 34.

Photolamp 30 preferably comprises a high intensity xenon arc light source capable of illuminating the photomask with parallel light rays of uniform intensity. The elevation of photolamp 30 is readily adjustable by sliding the arm 28 holding the photolamp up or down to a desired elevation, then rotating a thumb screw 42 journaled in a threaded bore in arm 28, into peripheral contact with the shaft 26 on which the arm 28 is supported or mounted. Electric motor 44 is coupled by a pulley belt 46 to gear reduction box 48 in which a rotatable screw 50 is rotatably journaled. The rotatable screw 50 is coupled to the carriage 18 in such fashion that screw rotation imparts rectilinear motion to carriage 18 along the path defined by guide blocks 24.

Laser source 52 produces a coherent light beam which is directed by table mounted mirrors 54 and 56 into aperture 58 of beam splitter housing 16. The laser source 52 may comprise a helium-neon gas laser capable of producing red light at a wavelength of 6,328 angstroms. By an arrangement described hereinafter, each time carriage 18 moves a distance corresponding to 80 half wavelengths of the coherent light beam (about 25 micrometers or 1 mil), a light pulse is emitted by photolamp 30. Accordingly, about 1,000 light pulses occur in each linear inch of carriage travel.

Laser source 52, the aforementioned beam splitter, a carriage mounted mirror 60, and other elements comprise a coherent light beam interferometer operative to determine carriage position relative to platform 14. Interferometer operation is such that the coherent light beam entering the housing aperture 58 impinges upon the beam splitter arrangement and is split into two component beams. One component beam impinges on mirror 60 while the other component beam impinges on a stationary reference mirror within the housing 16. These mirrors reflect the respective beams back to the beam-splitting arrangement where the beams are recombined and directed to a photosensitive element, such as reverse biased photodiode, comprising part of an interference fring detector 62 for converting the recombined light beam into a corresponding electrical signal. The path length of the component beam impinging on mirror 60 increases while the path length of the component beam impinging on the aforementioned stationary reference mirror remains constant as the carriage 18 moves laterally away from the platform 14. The intensity of the recombined coherent light beam impinging on the photosensitive element of detector 62 varies in sinusoidal fashion as carriage 18 moves to produce interference fringes corresponding to the maximum intensity of the composite beam which occurs each time the path length of the variable length component beam changes by a full wavelength. The detector 62 converts the detected sinusoidally varying intensity of a composite beam into a sinusoidally varying current. The use of a coherent light beam interferometer is preferred to obtain the sharpest possible interference fringes, however, it is believed that a noncoherent light beam interferometer utilizing filtered monochromatic light may also be successfully employed. Relatively sharp interference fringes are desirable from the viewpoint of resultantly obtaining accurately spaced lines in the grid ultimately produced.

A counter 64, coupled to the detector 62, includes a Schmidt trigger flip-flop which changes state each time the aforementioned sinusoidally varying current passes through respective positive and negative threshold voltage levels near the null or zero voltage level. The counter 64 is preset so that the occurrences of a preselected number of changes in the state of the flip-flop, corresponding in number to the interference fringes detected, will actuate a photolamp trigger circuit 66.

The trigger circuit 66 includes an SCR or silicon controlled rectifier suitably coupled to a pulse amplifier. The pulse amplifier is in turn coupled to a photolamp excitation coil by means of a pulse transformer. Trigger actuation results in on triggering of the SCR whereupon the excitation coil effects a discharge pulse in the photolamp. Each time a discharge pulse is triggered in the photolamp, a brief light pulse, typically on the order of 10 microseconds duration, is produced, resulting in the formation of a relatively clear or unblurred, latent photographic image in the photographic plate which is effected by translumination through the aperture slit in the photomask.

The circuitry coupling the interferometer sensor to the photolamp 30 is conventional in nature and need not be described in great detail. The primary objective accomplished by the interferometer, detector 62, counter 64, and photolamp trigger circuit 66 is the flashing of the photolamp 30 in synchronization with the motion of the photomask 10 across the photographic plate 34 so that the successive images formed thereby are uniformly spaced to a relatively high degree of accuracy. Electronic counting of half wavelength fringes can be set to produce any desired spacing between the images. It is contemplated that certain apparatus applications may arise wherein successive image spacings are to be varied in predetermined multiples of a preselected incremental distance. This apparatus application capability can be readily implemented by persons skilled in the art.

The time interval between successive lamp pulses is established by carriage velocity, the wavelength of the coherent light beam emitted by the laser source 52, and the setting of the counter 64. In the exemplary embodiment described herein, the velocity of carriage travel is adjustable over a range of about 0.25 to about 0.05 mils per second. If the carriage 18 is traveling 0.25 mils per second, the coherent light beam wavelength is 6,328 angstroms, and the counter 64 is set to count 80 interference fringes per flash, the photolamp 30 will flash once each four seconds and 1,000 flashes will occur per inch of carriage travel. Carriage travel is relatively slow to minimize position error of individual images formed in the photographic plate 34 and to achieve clear, sharply defined, unblurred images since the flash duration, of about 10 microseconds, is much less than the time in which the carriage 18 travels a distance equal to the width of the aperture slit 8 in the photomask 10.

In a preferred technique, in accordance with the present invention, the exposed emulsion of the photographic plate, obtained by use of the apparatus of FIG. 1, is developed to obtain a series of parallel strips of opaque material in an otherwise transparent field. The resultant article may be designated a photomaster.

Next, a glass substrate coated with successive layers of metal and photoresist is provided. This article may be designated a submaster blank. The photomaster is placed upon the blank with the emulsion of the former contacting the photoresist of the latter. This assemblage is subjected to light rays directed toward the photomaster. The light rays pass through the transparent emulsion material onto the photoresist areas aligned therewith while the opaque strips of emulsion material mask the photoresist areas aligned therewith to prevent exposure thereof. The exposed photoresist material polymerizes and hardens.

Next, the photoresist is subjected to a selective solvent which removes nonexposed photoresist. Consequently, a pattern of parallel aperture slits, corresponding to the pattern of opaque strips in the emulsion, are formed in the photoresist. The metal at the bottom of the aperture slits in the photoresist is removed to form a series of metal-free strips within the metal film. At this stage the remaining photoresist is preferably, but not necessarily, removed. The resultant article constitutes a photographic submaster since the remaining metal is opaque to light.

Next, a dielectric target substrate coated with respective layers of metal and photoresist is provided. This article may be designated a target blank. The submaster is placed on the target blank with the metal of the former contacting the photoresist of the latter. The photoresist of the latter is subjected to light projected through the metal-free strips of the submaster to expose and polymerize corresponding strips of photoresist material of the latter. The submaster is repositioned on the target blank so that the metal-free strips are oriented at 90° relative to the previously exposed photoresist strips of the target blank. Exposure of the assemblage is repeated to polymerize a second set of strips of photoresist.

Next, the photoresist on the target blank is subjected to a selective solvent to remove the areas which were not exposed to light. As a result, a grid of criss-crossing strips of polymerized photoresist is formed on the target substrate with square areas of unprotected metal being located in the interstices of the photoresist grid. The metal squares are removed to form a metal grid on the target substrate underlying the photoresist grid. Next, the remaining photoresist grid is entirely removed. The resultant article may be utilized as a target in a storage tube. The above described steps may be better understood with reference to FIGS. 3–6.

FIG. 3a schematically depicts the movement of the photomask 10 to successively align the aperture slit 8 with respective areas of the photographic plate 34. In the shown position the photomask 10 has already passed through successive positions whereat respective latent strip images have been formed in the photosensitive emulsion 36 by the projection of light through the aperture slit 8 and through the oil film 41 onto the emulsion 36 aligned with the aperture slit 8 in the respective positions.

FIG. 3b depicts the photographic plate 34 after the completion of the exposure operation and the development of the photosensitive emulsion. The resultant article or photographic master 34A, as can be seen, has opaque emulsion lines 68 (viewed endwise) where the emulsion had been exposed. The nonexposed emulsion is effectively transparent.

FIG. 4a shows the alignment of the master 34A with a submaster blank 70 comprising a transparent glass substrate 72 having a metal film 74 and a photoresist film 76 thereon. The metal film 74 comprises blended chromium-gold formed by depositing a layer of chromium about 500 angstroms thick upon the glass substrate and then depositing a layer of gold about 1,000 angstroms thick upon the chromium. The photoresist film 76 deposited on the metal film 74 is around 2,000–3,000 angstroms thick. As shown in FIG. 4a, the master 34A is positioned on the submaster blank 70 with the emulsion film 36 abutting the photoresist.

Figure 4C:
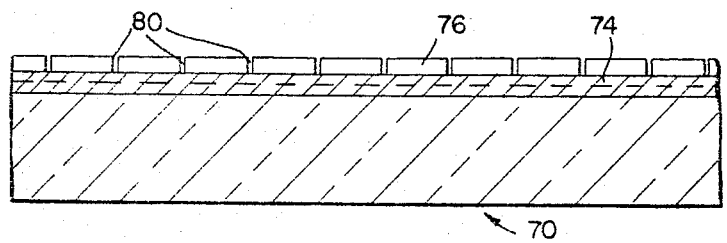

The photoresist 76 is exposed to ultraviolet light, for an exposure interval of about ½–2 minutes, from a mercury vapor lamp, projected through the transparent areas of the emulsion film 36 to polymerize and harden the exposed photoresist. Upon completion of this exposure, the photoresist 76 contains nonpolymerized strips 78 (viewed endwise). The photoresist 76 is developed by applying a selective solvent thereto. The solvent dissolves the nonexposed photoresist strips 78 which were aligned with the opaque strips or lines 68 during the foregoing exposure. Consequently, a series of parallel aperture slits 80 are formed in the photoresist as shown in FIG. 4c. Next, the metal at the bottom of the aperture slits 80 is removed to form the metal-free strips 82 shown in FIG. 4d.

Figure 4D:
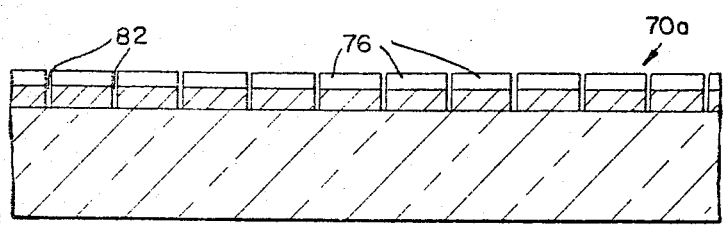

Metal removal to form strips 82 is preferably accomplished by generally conventional ion beam micromachining. Exemplarily, ion beam micromachining may be accomplished by supporting the FIG. 4c article in an evacuated chamber on an electrode paddle located about 10 inches from an ion beam gun. Argon gas in the ion beam gun is ionized by impact thereof by electrons in the ion beam gun. A potential difference of about 5,000 volts is applied between the electrode paddle and the ion beam gun to flood the surface of the photoresist 76 with a suitably focused beam of ionized argon ions. These argon ions strike the article surface to sputter away the metal at the bottom of the aperture slits 80. It is preferable, but not necessary, to remove the photoresist 76 remaining on the micromachined metal film 74. The resultant submaster 70a is shown in FIG. 4d with the photoresist left on.

The use of ion beam micromachining to remove the metal at the bottom of the photoresist aperture slits is preferred to the use of a chemical agent for etching the metal in order to avoid undercutting of the metal below the photoresist and resultant loss of edge definition of the aperture slits formed in the metal. Ion beam micromachining is capable of producing grid lines of good edge definition in the micron and even submicron range.

The resultant article or submaster 70a may now be employed in the manner illustrated in FIG. 5a wherein the submaster 70a is positioned on a target blank 90 with the photoresist of the submaster abutting a layer of photoresist on the target blank. The target blank 90 comprises a substrate of dielectric material 92 coated with a first layer of metal 94 and a second (aforementioned) layer of photoresist 96. Exposure of the photoresist 96 on the target substrate 92 is accomplished by projecting ultraviolet light through the aperture slits of the submaster 70a onto the areas of the photoresist aligned therewith to form the image pattern shown in FIG. 5b.

The submaster 70a is reoriented relative to the target blank 90 by rotating the submaster 90° with respect to the target blank. Another photoresist exposure is performed resulting in orthogonally intersecting sets of exposed polymerized strips of photoresist. The photoresist 96 is now developed to wash away nonexposed photoresist thus leaving behind a grid array of exposed photoresist strips 98, as shown in FIG. 5c, with square areas of the underlying metal 94 on the target substrate located therebetween. Subsequent removal of the exposed metal squares produces a grid array of orthogonally intersecting metal grid strips underlying the remaining photoresist lines. Straightness of the photoresist grid lines largely determines the straightness of the resultant metal grid lines of strips. In the present invention, straightness of the photoresist grid lines is such that photoresist grid line edge definition, which may be defined as the maximum deviation of any point along a photoresist grid line from a straight line coincident with the edge of the grid line, of better than 0.2 micrometers is achieved. The photoresist grid is now entirely removed, whereby a grid target on the target substrate having interstitial metal-free squares on the target substrate between the grid lines is produced as shown in FIG. 5d.

The target 90a shown in FIG. 5d can be better seen in the plan view shown in FIG. 6. In FIG. 6, the storage tube target grid comprises a round dielectric quartz substrate 92 supporting a round metal grid of coextensive diameter consisting of orthogonally intersecting metal grid lines 100 encircled by a border of gold metal deposited peripherally upon the grid side of the substrate. Exemplarily, a 2 inches diameter substrate having a metal grid thereon of coextensive diameter has been formed wherein the individual grid lines 100 are about 5 microns wide and wherein the grid line center spacing is about 25 micrometers so that approximately 1,000 grid lines per inch in orthogonally related directions on the substrate surface are provided. Generally, the substrate 92 may be of any suitable size and shape. The individual grid lines 100 may be as narrow as a fraction of a micron wide, as for example 0.25 micrometers, but more typically are about 1–6 micrometers wide. The width of the respective grid lines 100 depends upon the width of the aperture slit which has been scribed in the photomask. The apparatus shown in FIG. 2 is capable of producing as many as 8,000 grid lines per inch on the substrate surface.

A procedure for establishing in a somewhat general way the perfection or quality of the target may be outlined briefly and generally as follows. The target is operably positioned in a storage tube. The target is scanned by an electron beam to write or read voltage information stored on the target. The information as it is read is simultaneously displayed on an oscilloscope. The variation in the shades of gray seen on the oscilloscope constitutes a rough measurement of the noise level attributable to nonuniformities and errors in the target grid due to irregular grid line spacing and irregularities in the individual grid lines. Since, in general, the quantity of charge that is stored at a particular interstitial grid point on the tube screen by a scanning electron beam is related to the size or dimension of the associated area between the associated grid lines it should be apparent that the voltage information seen in reading the storage tube is related to the uniformity of the target grid. More particularly, variation of the area of the individual metal-free squares or areas on the surface of the target substrate from a desired standard area result in varying shades of gray, either lighter or darker than a standard shade of gray. Nonuniform spacing between parallel grid lines thus causes uneven and preceptibly different shades of gray writing on the tube screen, which limits the lowest level signals which can be displayed and distinguished from a background noise level.

One measure of the degree of perfection of a target grid is the nature of the moire test pattern which is observed when the target is placed in contact with a perfectly repetitive pattern with the same spacing and the two are viewed by transmitted light since, as is well-known, moire test patterns in effect constitute optical magnifications in the line grating or grid pattern. Typical target grid structures have moire test patterns containing nonrepetitive, irregular, wavey lines or ripples. The present invention produces grid patterns wherein these moire test pattern features are significantly less pronounced.

While a specific embodiment of this invention has been illustrated and described in detail herein, it is obvious that various modifications thereof may be made without departing from the scope and spirit of the appended claims.

What is claimed is:

1. In a method for forming a metal grid of orthogonally intersecting metal lines on a target substrate, the steps of:
    aligning a photomask having a single slit with a photographic plate comprising a film of photosensitive emulsion on a transparent substrate;
    moving the photomask across the photographic plate while intermittently projecting light through the slit onto the photosensitive emulsion so as to form a series of parallel, uniformly spaced, latent line images in the photosensitive emulsion each conforming to the slit;
    developing the photosensitive emulsion to form a photographic master with a pattern of opaque lines in a transparent background in the emulsion;
    aligning the photographic master with a transparent substrate coated with a first layer of metal and a second layer of photoresist;
    exposing the photoresist through the photographic master to form a nonexposed photoresist image pattern in the photoresist corresponding to the opaque line pattern in the photographic master;
    developing the photoresist to selectively remove the nonexposed photoresist;
    selectively removing the metal at the areas where the nonexposed photoresist has been removed to form a photographic submaster having a pattern of slits in the first layer of metal;
    aligning the submaster with a target substrate coated with a first layer of metal and a second layer of photoresist;
    exposing the photoresist on the target through the submaster;
    reorienting the submaster relative to the target in a direction substantially orthogonal to the relative orientation during the preceding exposure of the photoresist of the target;

again exposing the photoresist on the target through the submaster;

selectively removing nonexposed photoresist on the target to form a grid pattern of orthogonally intersecting lines of exposed photoresist;

forming a grid of orthogonally intersecting metal grid lines on the target substrate by selectively removing the areas of the metal film on the target substrate between the lines of the photoresist grid pattern; and removing the photoresist grid pattern whereby a grid of orthogonally intersecting metal grid lines is formed on the target substrate.

2. In the method set forth in claim 1 the step of removing the exposed photoresist from the transparent substrate after the pattern of slits has been formed in the first layer of metal on the transparent substrate.

3. The method set forth in claim 1 wherein the steps involving the selective removal of metal are accomplished by ion beam micromachining.

4. The method set forth in claim 1 wherein the interface between the photomask and photographic plate is lubricated prior to the moving of the photomask across the photographic plate.

5. Apparatus comprising:

support means for supporting an article such as a photographic plate;

photolamp means for repetitively emitting flashes of light mounted in operative relation to said support means;

a photomask;

optical immersion fluid having an index of refraction approximately matching that of the surface of said photomask and the article;

said optical immersion fluid being disposed between said photomask and the article, said photomask being located on the article so as to be interposed between said support means and said photolamp means;

means for effecting relative movement between said photomask and the article on the support means;

sensing means for sensing the relative position of the article with respect to said photomask during the aforementioned relative movement;

cooperable means coupled to said photolamp means and being responsive to said sensing means to cause said photolamp means to emit flashes of light at successive predetermined relative positions of the article with respect to the photomask; and the arrangement being such that consecutive flashes from said photolamp means expose respective areas of the article through said photomask.

6. The apparatus of claim 5 wherein said optical immersion fluid is a low fluorescent lubricant.

* * * * *